United States Patent
Mishima et al.

(10) Patent No.: US 9,052,182 B2
(45) Date of Patent: Jun. 9, 2015

(54) STYLUS ABRASION DETECTION METHOD AND SURFACE PROPERTY MEASUREMENT DEVICE

(75) Inventors: Hideki Mishima, Miyazaki (JP); Shingo Kuroki, Miyazaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 633 days.

(21) Appl. No.: 13/169,448

(22) Filed: Jun. 27, 2011

(65) Prior Publication Data

US 2012/0010826 A1 Jan. 12, 2012

(30) Foreign Application Priority Data

Jul. 6, 2010 (JP) .................................. 2010-154066

(51) Int. Cl.
 *G01B 5/28* (2006.01)
 *G01B 21/04* (2006.01)

(52) U.S. Cl.
 CPC ................ *G01B 5/28* (2013.01); *G01B 21/042* (2013.01)

(58) Field of Classification Search
 CPC ....... G01Q 40/00; G01Q 40/02; G01N 19/08; G01N 29/265; G01N 29/30; G01N 29/82; G01N 29/46; G01B 21/047; G01B 21/20; G01B 21/042
 USPC .......................................................... 702/34
 See application file for complete search history.

(56) References Cited

U.S. PATENT DOCUMENTS

| 5,955,654 | A | * | 9/1999 | Stover et al. .................... 73/1.89 |
| 7,882,723 | B2 | | 2/2011 | Takahama et al. |
| 2002/0062572 | A1 | * | 5/2002 | Bindell et al. ................... 33/546 |
| 2008/0295571 | A1 | | 12/2008 | Takahama et al. |
| 2009/0259435 | A1 | | 10/2009 | Enomoto et al. |
| 2010/0286961 | A1 | * | 11/2010 | Kojima ......................... 702/184 |
| 2011/0138895 | A1 | | 6/2011 | Yamada et al. |
| 2011/0197665 | A1 | | 8/2011 | Sakata et al. |

FOREIGN PATENT DOCUMENTS

| FR | 2921476 | 3/2009 |
| JP | 4-24408 | 6/1992 |
| JP | 09178470 A * | 7/1997 |
| JP | 2010-31116 | 2/2010 |
| JP | 2011-169616 A | 9/2011 |

OTHER PUBLICATIONS

English Machine Translation from JPO database, JP-09178470, Murakami Mitsuo.*

* cited by examiner

*Primary Examiner* — Mischita Henson
*Assistant Examiner* — Terence Stifter, Jr.
(74) *Attorney, Agent, or Firm* — Greenblum & Bernstein, P.L.C.

(57) ABSTRACT

A stylus abrasion detection method includes obtaining a measurement curve of a standard specimen in which an unevenness that changes periodically is formed on a surface, by causing a stylus to trace along the surface of the standard specimen, detecting a displacement of the stylus in a direction perpendicular to the tracing direction, and using the displacement for obtaining the measurement curve; performing a frequency analysis on the measurement curve; calculating an abrasion amount of the stylus from a result of the frequency analysis; and displaying the abrasion amount calculated by the abrasion amount calculation.

5 Claims, 9 Drawing Sheets

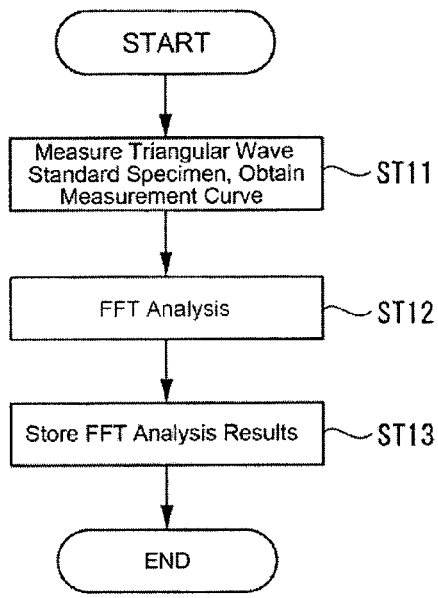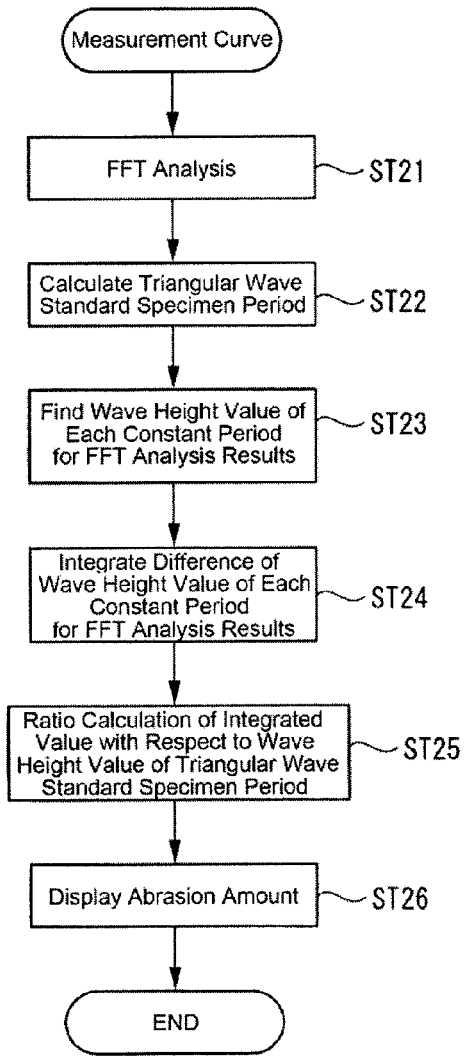

STYLUS ABRASION DETECTION METHOD AND SURFACE PROPERTY MEASUREMENT DEVICE

CROSS-REFERENCE TO RELATED APPLICATIONS

The present application claims priority under 35 U.S.C. §119 of Japanese Application No. 2010-154066, filed on Jul. 6, 2010, the disclosure of which is expressly incorporated by reference herein in its entirety.

BACKGROUND OF THE INVENTION

1. Field of the Invention

The present invention relates to a stylus abrasion detection method and surface property measurement device. Specifically, the invention relates to a stylus abrasion detection method and surface property measurement device which detect an abrasion state of a stylus in a surface property measurement device.

2. Description of Related Art

Surface property measurement devices are known which measure surface properties such as the surface roughness, the surface shape, and so on of a measured object (for example, Japanese Utility Model Application Publication No. H4-24408 and the like). Such devices bring a stylus into contact with a surface of a measured object and in this state the stylus traces along the surface of the object to be measured. According to the surface properties of the object to be measured, the stylus is displaced in a direction perpendicular to a tracing direction, and therefore it is possible to measure the surface properties of the object to be measured from the displacement amount in the position of the stylus.

In a surface property measurement device, a stylus traces along a surface of a measured object in a state where the stylus is in contact with a surface of an object to be measured, and therefore the tip of the stylus is likely to be abraded. The tip of a stylus is commonly a hemispherical shape with a diameter of approximately 2-4 µm, and therefore it is difficult to determine by visual observation the state of abrasion or chips in a stylus. When measurement is performed with the tip of the stylus abraded, the surface properties, especially the surface roughness, cannot be accurately measured, and therefore it is desirable to detect the abrasion state of a stylus and to prompt a change of stylus at the point when abrasion has reached more than a certain level.

As such, applicants have proposed a "Surface Property Measurement Device" which, first, detects the movement distance in the tracing direction of a stylus, then cumulatively stores the detected movement distance of a stylus, compares the cumulative movement distance with a set threshold value, and when the cumulative movement distance has surpassed the threshold value, prompts a change of stylus (see Japanese Patent Application No. 2010-31116).

However, even when the cumulative movement distance of the stylus is used to detect the abrasion, the abrasion state of a stylus differs according to the hardness of an object to be measured, and therefore it is not possible to accurately determine the abrasion state. In particular, when a defect such as a chip has developed in the tip of a stylus before the cumulative movement distance of the stylus reaches a threshold value, it is difficult to detect the defect.

SUMMARY OF THE INVENTION

The present invention provides a stylus abrasion detection method and a surface property measurement device which are capable of appropriately informing to change a stylus in response to abrasion or defect in a stylus.

A stylus abrasion detection method according to the present invention detects abrasion of a stylus with a surface property measurement device, the device causing a stylus to contact on a surface of a measured object, while causing the stylus to trace along the surface of the measured object by maintaining the contact of the stylus against the surface, detecting a displacement of the stylus in a direction perpendicular to the tracing direction, and measuring a surface property of the measured object from the detected displacement amount of the stylus. The method includes: obtaining a measurement curve of a standard specimen in which an unevenness that changes periodically is formed on a surface, by causing the stylus to trace along the surface of the standard specimen, detecting a displacement of the stylus in a direction perpendicular to the tracing direction, and using the displacement for obtaining the measurement curve; performing a frequency analysis on the measurement curve; calculating an abrasion amount of the stylus from a result of the frequency analysis; and displaying the abrasion amount calculated by the abrasion amount calculation.

The above method provides obtaining a measurement curve of a standard specimen in which an unevenness that changes periodically is formed on a surface, by causing the stylus to trace along the surface of the standard specimen; performing a frequency analysis on the measurement curve; and calculating an abrasion amount of the stylus from a result of the frequency analysis. When the stylus is not abraded, the traced wave form (measurement curve) on the surface of the standard specimen traced by the stylus is substantially the same as the unevenness wave form of the standard specimen. When the stylus is abraded, however, the traced wave form (measurement curve) on the surface of the standard specimen traced by the stylus is distorted with respect to the unevenness wave form of the standard specimen. Accordingly, when the frequency analysis is performed on the measurement curve, the result shows the effect of the abrasion and chips in the stylus. Therefore, it is possible to detect the abrasion and chips in the stylus from the frequency analysis result. Furthermore, the detected abrasion amount is displayed, which makes it possible to accurately prompt a change of the stylus.

According to the stylus abrasion detection method of the present invention, the obtaining of the measurement curve preferably includes: using a sine wave standard specimen in which an unevenness formed in the shape of a sine wave on a surface; and while causing the stylus to trace along the surface of the sine wave standard specimen, detecting a measurement curve of the sine wave standard specimen. The calculating of the abrasion amount includes: performing a filter process on the result of the frequency analysis such that only a period shorter than an unevenness period of the sine wave standard specimen remains; obtaining an integrated value of a wave height value of a result obtained by the filter process; and obtaining a ratio of the integrated value to a wave height value of the unevenness period of the sine wave standard specimen. The displaying of the abrasion amount includes: displaying the ratio obtained from the calculating of the abrasion amount.

In the above method, a sine wave standard specimen is used during the obtaining of the measurement curve of the sine wave standard specimen. Further, during the calculating of the abrasion amount, a filter process is performed on the result of the frequency analysis of the measurement curve of the sine wave standard specimen, such that only a period shorter than an unevenness period of the sine wave standard specimen remains. Therefore, the period comparatively shorter than the unevenness period of the since wave standard specimen appears, which makes it possible to highlight the distortion effect of the stylus abrasion. Then, an integrated value of a wave height value of the result obtained by the filter process is obtained, and a ratio of the integrated value to a wave height value of the unevenness period of the sine wave standard specimen is obtained and displayed. Therefore, it is possible to detect the stylus abrasion with high accuracy.

Preferably, the stylus abrasion detection method according the present invention includes: storing a frequency analysis result of an initial value, performed by causing an unused stylus to trace along a surface of a triangular wave standard specimen in which an unevenness is formed in a shape of a triangular wave on a surface, detecting a displacement of the stylus in a direction perpendicular to the tracing direction, obtaining a measurement curve of the triangular wave standard specimen from the displacement, and performing a frequency analysis on the measurement curve to obtain an initial value. The obtaining of the measurement curve includes: using the triangular wave standard specimen; and obtaining a measurement curve of the triangular wave standard specimen while causing a used stylus to trace along the surface of the triangular wave standard specimen. The performing of the frequency analysis includes: obtaining a result of a frequency analysis for abrasion detection by performing a frequency analysis on the measurement curve. The calculating of the abrasion amount includes: obtaining a wave height value for each corresponding predetermined period from the result of the frequency analysis of the initial value and the result of the frequency analysis for abrasion detection; integrating a difference between the wave height values of corresponding predetermined periods; and obtaining a ratio of the integrated value of the difference to the wave height value of an unevenness period of the triangular wave standard specimen. The displaying of the abrasion amount includes: displaying the ratio obtained by the calculating of the abrasion amount.

In the above method, while an unused stylus is caused to trace along a surface of a triangular wave standard specimen in which an unevenness is formed in a shape of a triangular wave on a surface, a displacement of the stylus is detected in a direction perpendicular to the tracing direction. A measurement curve of the triangular wave standard specimen is obtained from the displacement, and a frequency analysis is performed on the measurement curve, and the result of the analysis is stored as the frequency analysis result of an initial value. In addition, in order to detect an abrasion amount of a stylus after use, a measurement curve of the triangular wave standard specimen is obtained while causing the used stylus to trace along the surface of the triangular wave standard specimen. A frequency analysis is performed on the measurement curve of the triangular wave standard specimen, in order to obtain a frequency analysis result for abrasion detection. During the calculating of the abrasion amount, a wave height value for each corresponding predetermined period is obtained from the result of the frequency analysis of the initial value and the result of the frequency analysis for abrasion detection. Then, a difference between the wave height values of corresponding predetermined periods is integrated and a ratio is obtained and displayed, the ratio being of the integrated value of the difference to the wave height value of an unevenness period of the triangular wave standard specimen. Therefore, it is possible to detect the stylus abrasion with high accuracy.

A surface property measurement device according to the present invention causes a stylus to contact on a surface of the measured object, while causing the stylus to trace along the surface of the measured object by maintaining the contact of the stylus against the surface, detects a displacement of the stylus in a direction perpendicular to the tracing direction, and measures a surface property of the measured object from the detected displacement amount of the stylus. The device includes: a controller that obtains a measurement curve of a standard specimen in which an unevenness that changes periodically is formed on a surface, by causing the stylus to trace along the surface of the standard specimen, detecting a displacement of the stylus in a direction perpendicular to the tracing direction, and using the displacement for obtaining the measurement curve of the standard specimen; a frequency analyzer that performs a frequency analysis on the measurement curve; an abrasion amount processor that calculates an abrasion amount of the stylus from the frequency analysis result obtained by the frequency analyzer; and an abrasion amount display that displays the abrasion amount calculated by the abrasion amount processor. According to the above device, similar to the stylus abrasion detection method, it is possible to accurately prompt a change of the stylus.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 6A and 6B are flow charts illustrating an abrasion detection method (Example 2) which uses a triangular wave standard specimen according to the embodiment;

DETAILED DESCRIPTION OF THE INVENTION

Figure 1:
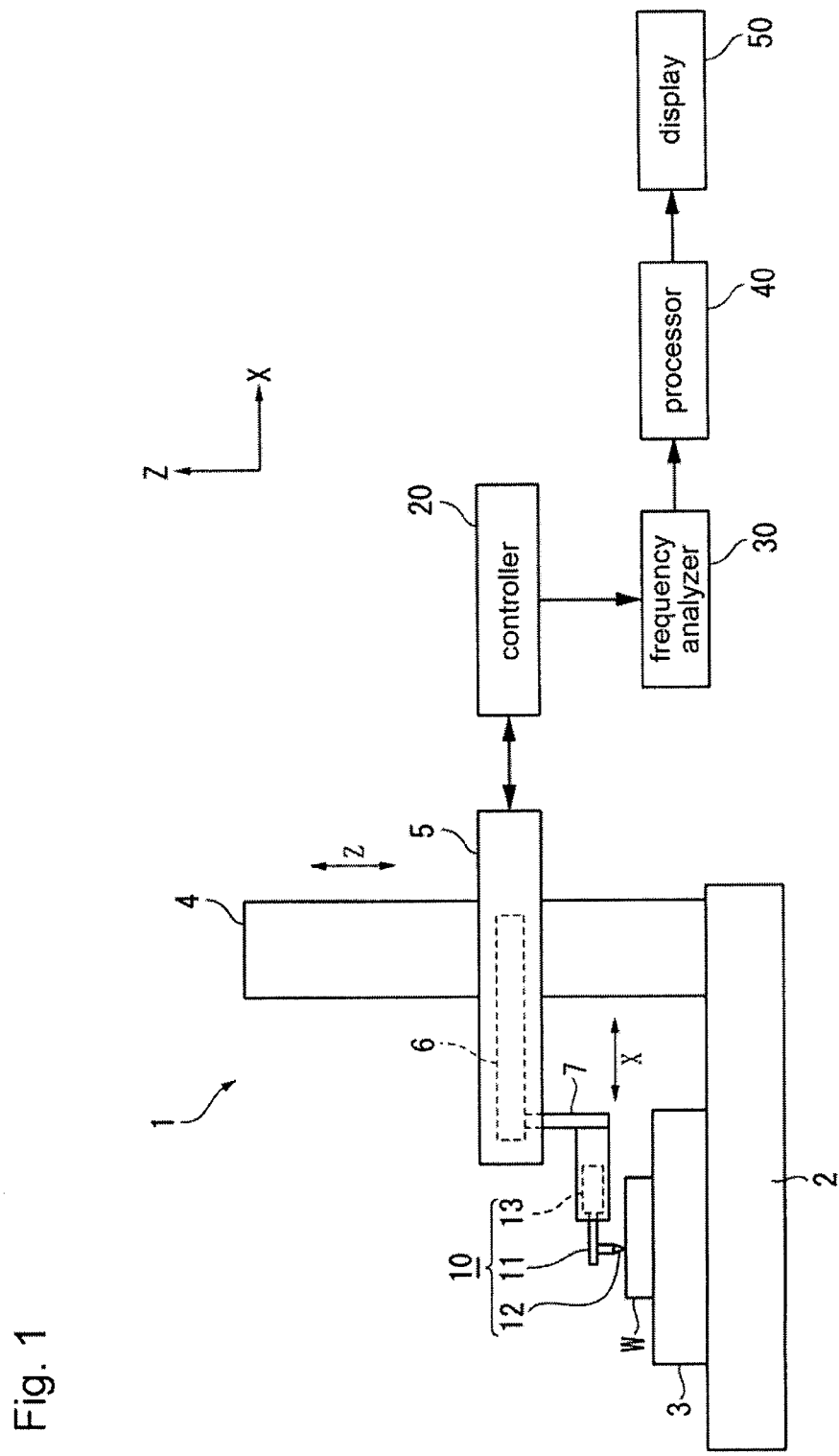
FIG. 1 illustrates a surface property measurement device according to an embodiment of the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

A surface property measurement device according to an embodiment of the present invention is described based on the figures.

<Explanation of a Surface Property Measurement Device>

A surface property measurement device is equipped with a surface property measurement device body 1, a controller 20, a frequency analyzer 30, a processor 40 which serves as an abrasion amount processor, and a display 50 which serves as an abrasion amount display.

The surface property measurement device body 1 is equipped with a base 2; a table 3 provided above the base 2 that carries a measured object W or a standard specimen for use in calibration; a column 4 erected above base 2; a Z-slider 5 provided raisably/lowerably in a vertical direction (Z-axis direction) along the column 4; an X-slider 7 provided to the Z-slider 5 movably in a horizontal direction (X-axis direction) through a drive mechanism 6; and a detector 10 provided to the X-slider 7. The detector 10 is equipped with an arm 11 swingably supported by the X-slider 7 at a central portion thereof; a stylus 12 attached to the tip of the arm 11; and a detector unit 13 that is provided on the basal end of arm 11 and which detects a displacement in a vertical direction (Z-axis direction) of the stylus 12.

While the controller 20 controls a drive mechanism (omitted from the figures) which raises and lowers Z-slider 5, and the drive mechanism 6 which drives the detector 10, the controller 20 brings the stylus 12 into contact with a surface of a measured object W. In this state, the controller 20 drives the drive mechanism 6, and while causing the stylus 12 to trace along the X-axis direction on the surface of the measured object W, a displacement of stylus 12 in the direction (Z-axis direction) perpendicular to the tracing direction is taken from the detector unit 13. The surface properties (roughness or shape) of a measured object W are then measured from the displacement amount in the Z-axis direction and the displacement amount in the X-axis direction of the stylus 12.

The frequency analyzer 30 performs a frequency analysis, specifically FFT (Fast Fourier Transform) analysis, on a measurement curve of the displacement amount in the Z-axis direction and the displacement amount in the X-axis direction of the stylus 12 acquired by the controller 20. The processor 40 calculates the abrasion amount of the stylus 12 from a frequency analysis result obtained by the frequency analyzer 30. The specifics of the calculation method will be described hereafter. The display 50 displays the results calculated by the processor 40, i.e., the abrasion amount of stylus 12, using a number, bar graph, color, or the like.

<Stylus Abrasion Detection Method>

First, using a standard specimen in which an unevenness that changes periodically is formed on a surface, a measurement curve of the standard specimen is acquired (measurement curve acquisition process). As a standard specimen, a sine wave standard specimen with an unevenness formed in the shape of a sine wave on a surface is used. Once the sine wave standard specimen is placed on top of the table 3, the stylus 12 is brought into contact with the surface of the sine wave standard specimen, and in this state the drive mechanism 6 is driven. As the stylus 12 moves along a surface of the sine wave standard specimen, the stylus 12 moves in the vertical direction according to the surface shape of the sine wave standard specimen. The vertical motion (displacement amount in the Z-axis direction) of the stylus 12 is detected by the detector unit 13, and the detector signals from the detector unit 13 accompanying the vertical motion, and the movement distance in the tracing direction of the stylus 12 (displacement amount in the X-axis direction) are entered into the controller 20, and the measurement curve of the sine wave standard specimen is obtained by the controller 20.

Figure 2:
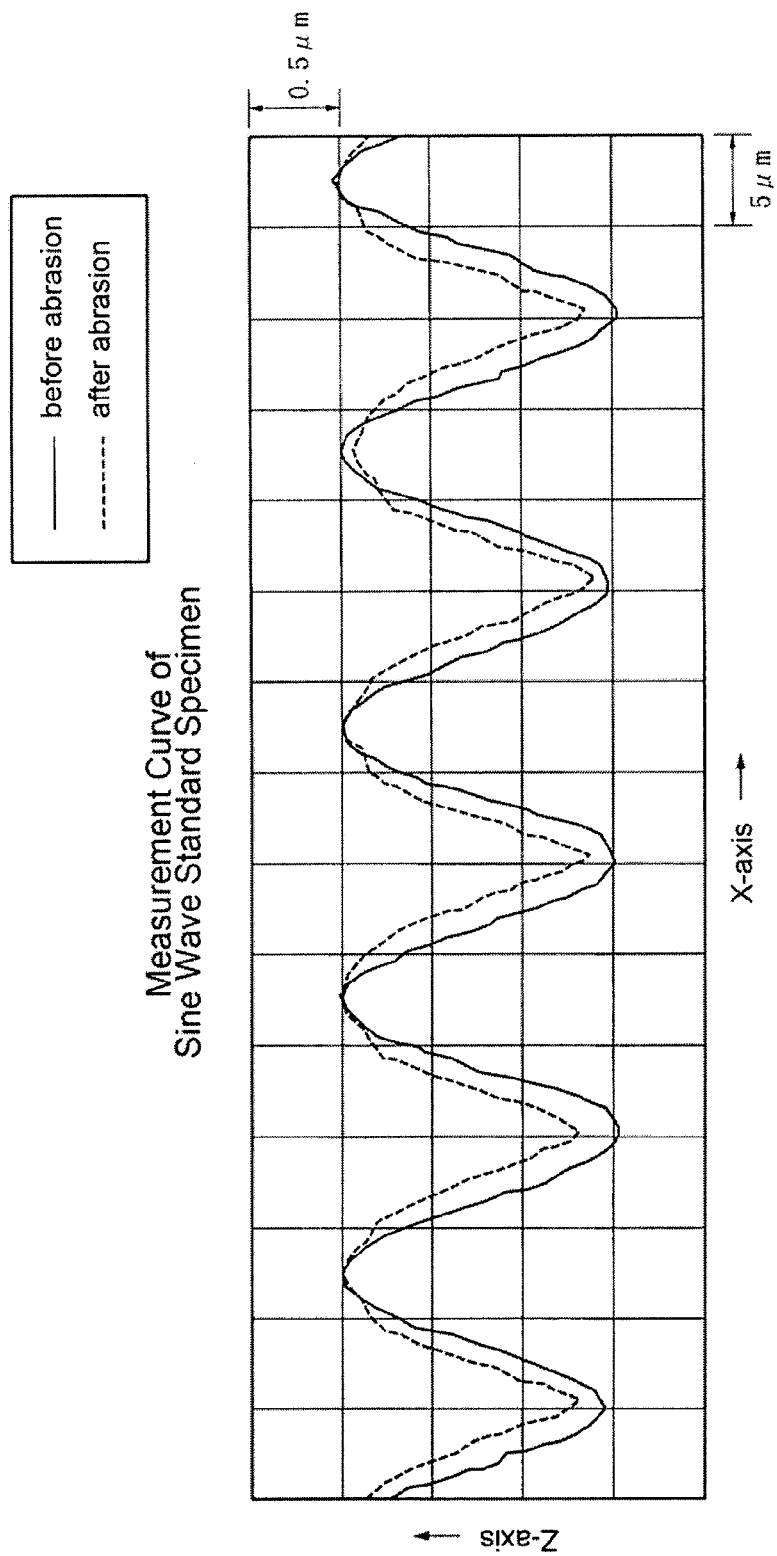
FIG. 2 illustrates a measurement curve of a sine wave standard specimen traced by a stylus with and without abrasion according to the embodiment.

FIG. 2 illustrates a measurement curve (solid line) of the surface of a sine wave standard specimen traced by the stylus 12 whose tip (a hemisphere of several microns' radius) is not in an abraded state, and a measurement curve (dotted line) of the surface of a sine wave standard specimen traced by the stylus 12 whose tip is in an abraded state. When the surface of a sine wave standard specimen is traced by the stylus 12 whose tip is in an abraded state, it is seen that the curve is distorted with respect to the original sine wave form. In particular, in FIG. 2 the period of the sine wave is comparatively short, and therefore a striking distortion effect appears.

Figure 3:
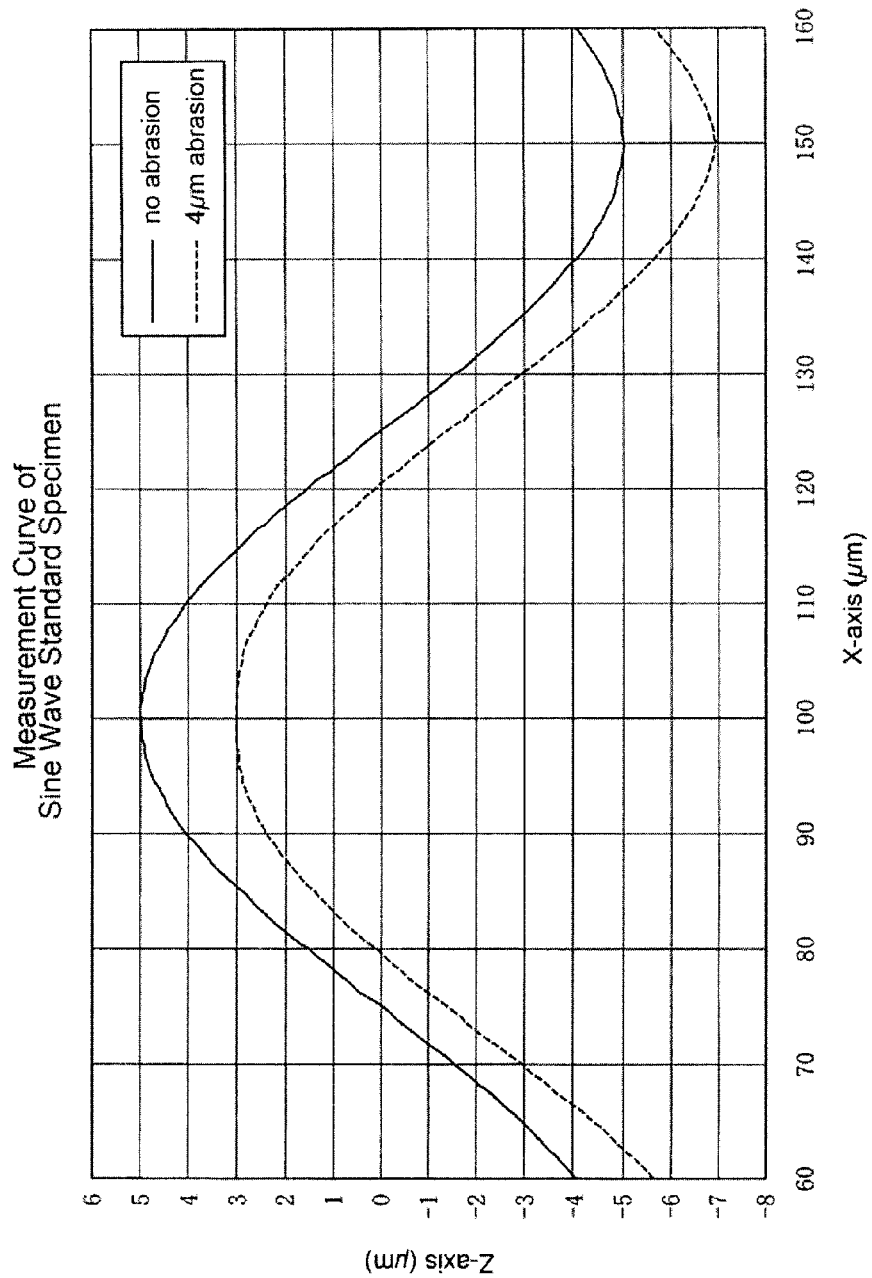
FIG. 3 illustrates a measurement curve of a sine wave standard specimen having a large period traced by a stylus with and without abrasion according to the embodiment.

The standard specimens commonly used for use in calibration have a long period of 100 μm. In the case of a sine wave standard specimen with such a long period, even when the stylus 12 with a tip radius of several microns is abraded, it is difficult to determine the abrasion state from an ordinary measurement curve. For example, in a state where the stylus 12 with a tip radius of 2 μm is abraded and tip curvature has completely disappeared, when a sine wave standard specimen having a period of 100 μm is measured, the measurement curve becomes that of FIG. 3. As compared to FIG. 2, because the period of the sine wave standard specimen is long with respect to the tip radius of the stylus 12, it is seen that it becomes difficult to determine the abrasion state of stylus 12 from the measurement curve.

[Abrasion Detection Method Using Sine Wave Standard Specimen]

Figure 4:
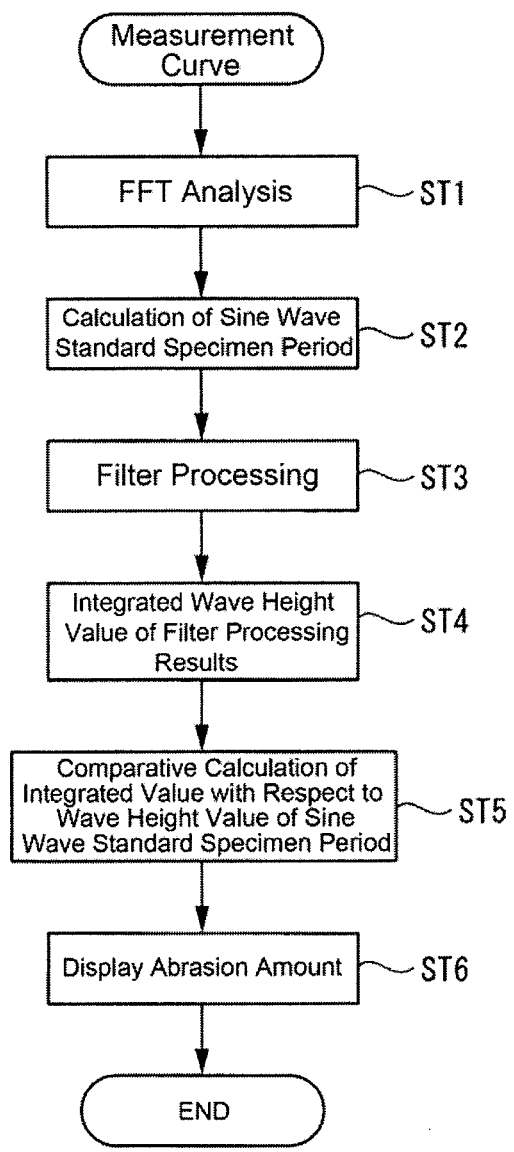
FIG. 4 is a flow chart illustrating an abrasion detection method (Example 1) which uses a sine wave standard specimen according to the embodiment.

In the present embodiment, the processing shown in FIG. 4 is performed to detect the abrasion amount of the stylus 12.

Figure 5:
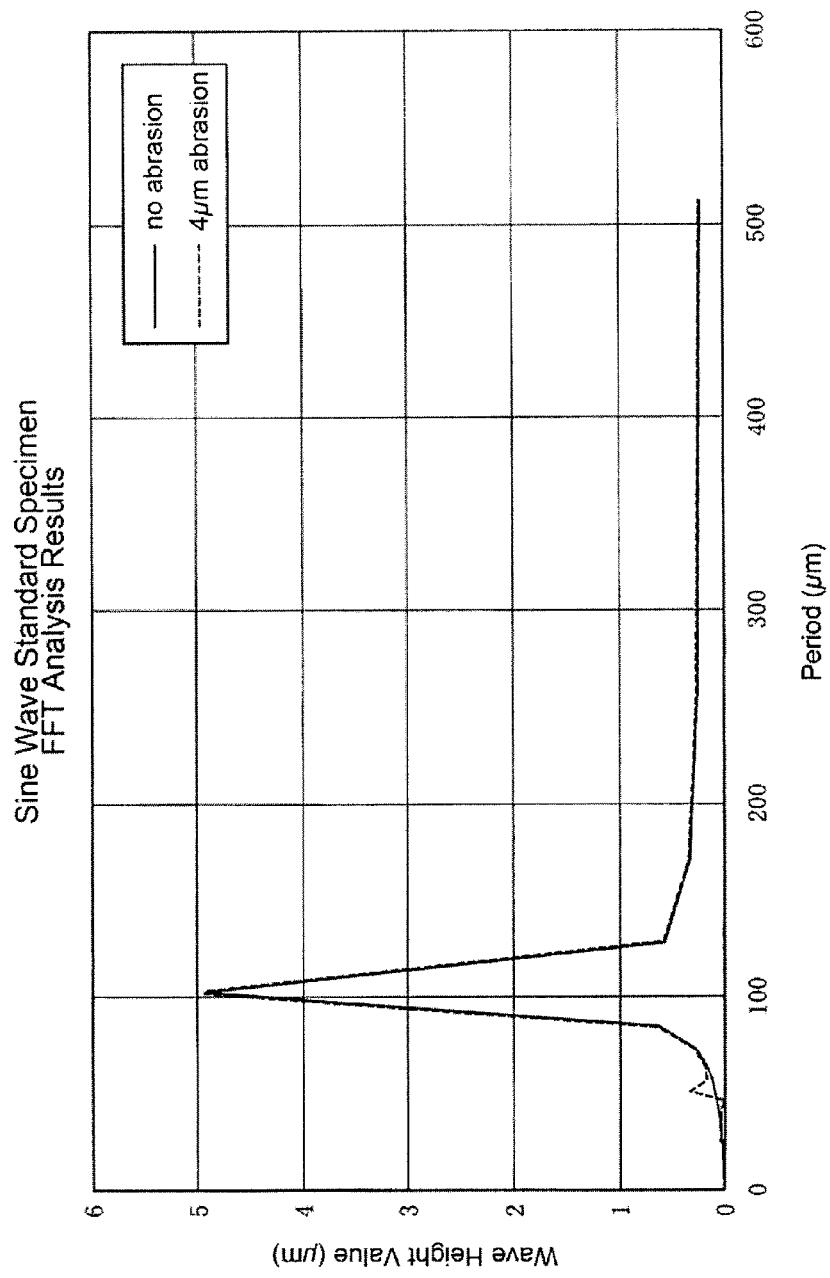
FIG. 5 illustrates FFT analysis results of the measurement curve of FIG. 3.

(Step 1) In the frequency analyzer 30, the measurement curve (measurement curve of a sine wave standard specimen) obtained by the controller 20 is taken and frequency analysis, specifically FFT (Fast Fourier Transform) analysis, is performed on the measurement curve (frequency analysis process). For example, when FFT analysis is performed on the measurement curve shown in FIG. 3, the results shown in FIG. 5 are obtained. In FIG. 5, in a case where the tip of the stylus 12 is not abraded (solid line), a wave height value appears only in a periodic section of the sine wave standard specimen. However, when the tip of the stylus 12 is abraded (dotted line), it is seen that a wave height value appears in a section shorter than the period of the sine wave standard specimen. That is, the measurement curve of a sine wave standard specimen traced by the abraded stylus 12 develops distortion with respect to a sine wave, and therefore due to the effect of this distortion, a wave height value appears in a section shorter than the period of the sine wave standard specimen. Further, in FIG. 5, it is seen that the power component of the distortion component which occurs due to abrasion on the stylus 12 is extremely small as compared to the power component of the sine wave period of a sine wave standard specimen.

Next, from the FFT analysis results obtained with the frequency analysis process, processing is performed which makes the influence of an abrasion component of the stylus 12 conspicuous, and the abrasion amount of the stylus 12 is calculated (abrasion amount calculation process).

(Step 2) From the FFT analysis results, the period of the sine wave standard specimen is obtained. That is, in FIG. 5, the period of the sine wave standard specimen is obtained from the period corresponding to the peak value of a wave height value.

(Step 3) Filter processing is performed on the FFT analysis results, such that only a period shorter than the sine wave period of the sine wave standard specimen remains. Specifically, by applying to the FFT analysis results a high-pass filter having a steep character in which the period of the sine wave standard specimen found in Step 2 is made the cut-off value, or by passing a steep bandpass filter which reduces numbers by taking the period of the sine wave standard specimen as its peak, only periods shorter than the sine wave period of the sine wave standard specimen remain.

(Step 4) The wave height value of the results obtained by the filter processing is calculated, that is, the integrated value of the wave height value is obtained.

(Step 5) The ratio of the integrated value to the wave height value of the sine wave period of the sine wave standard specimen is calculated.

(Step 6) Lastly, the ratio obtained by the processing described above is displayed on the display 50 as a standard for abrasion amount (abrasion amount display process). Specifically, the ratio obtained is displayed using a number, bar graph, color, or similar.

[Abrasion Detection Method Using a Triangular Wave Standard Specimen]

In the case of the abrasion detection method described above, when the standard specimen used is a triangular wave standard specimen with unevenness formed in the shape of a triangular wave, it is not possible to make an effective calculation. In this example, an unused (new) stylus 12 is used to measure a triangular wave standard specimen. FFT analysis is performed on the measurement curve thus obtained. This is stored as an initial value and compared to the FFT analysis results of a measurement curve for abrasion detection performed thereafter to calculate the abrasion amount of the stylus 12. Specifically, the processing shown in FIG. 6A and FIG. 6B is performed to detect the abrasion amount of the stylus 12.

(Steps 11-13) A measurement curve for a triangular wave standard specimen is acquired by causing an unused (new) stylus 12 to trace along a surface of the triangular wave standard specimen. The results of FFT analysis performed on the measurement curve are stored by a storage device or similar as an initial value frequency analysis result (initial value frequency analysis result storage process).

Figure 7:
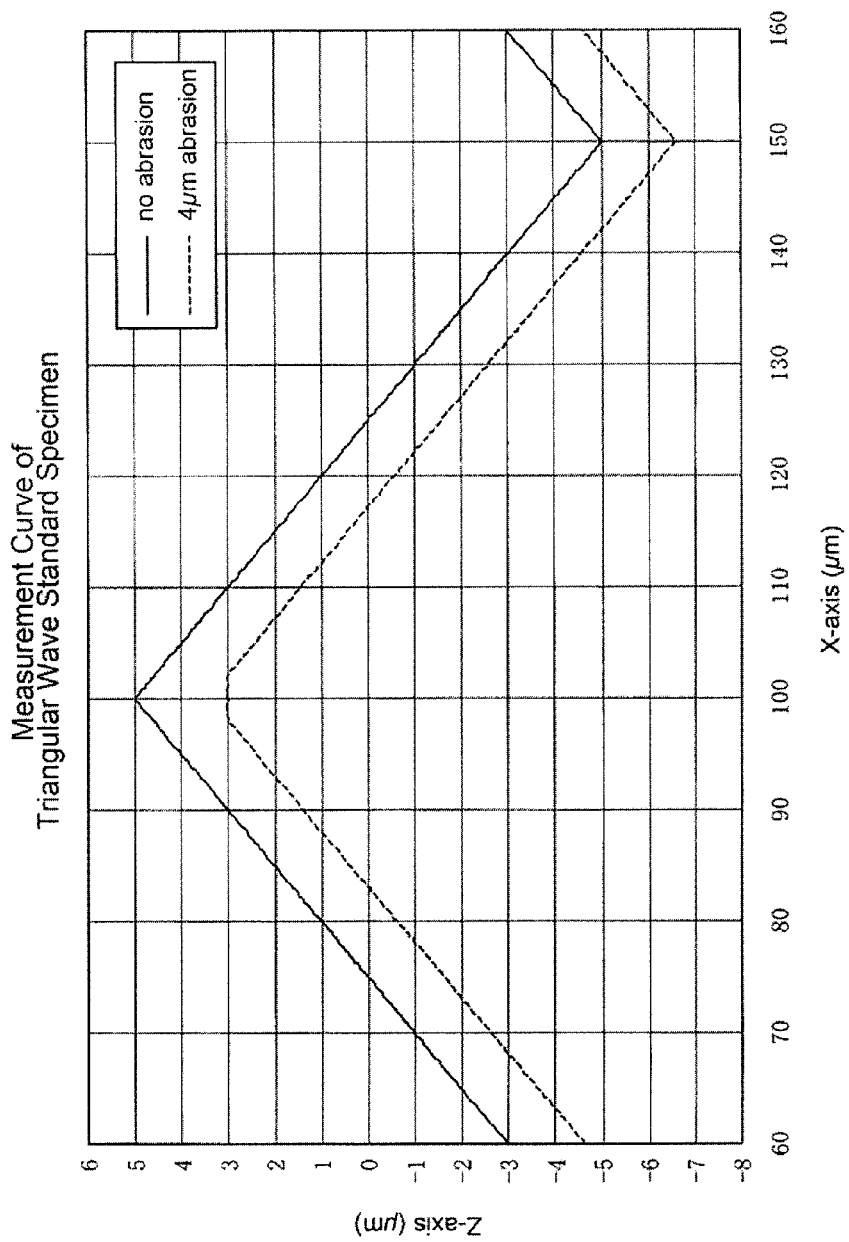
FIG. 7 illustrates a measurement curve of a triangular wave standard specimen traced by a stylus with and without abrasion according to the embodiment.
Figure 8:
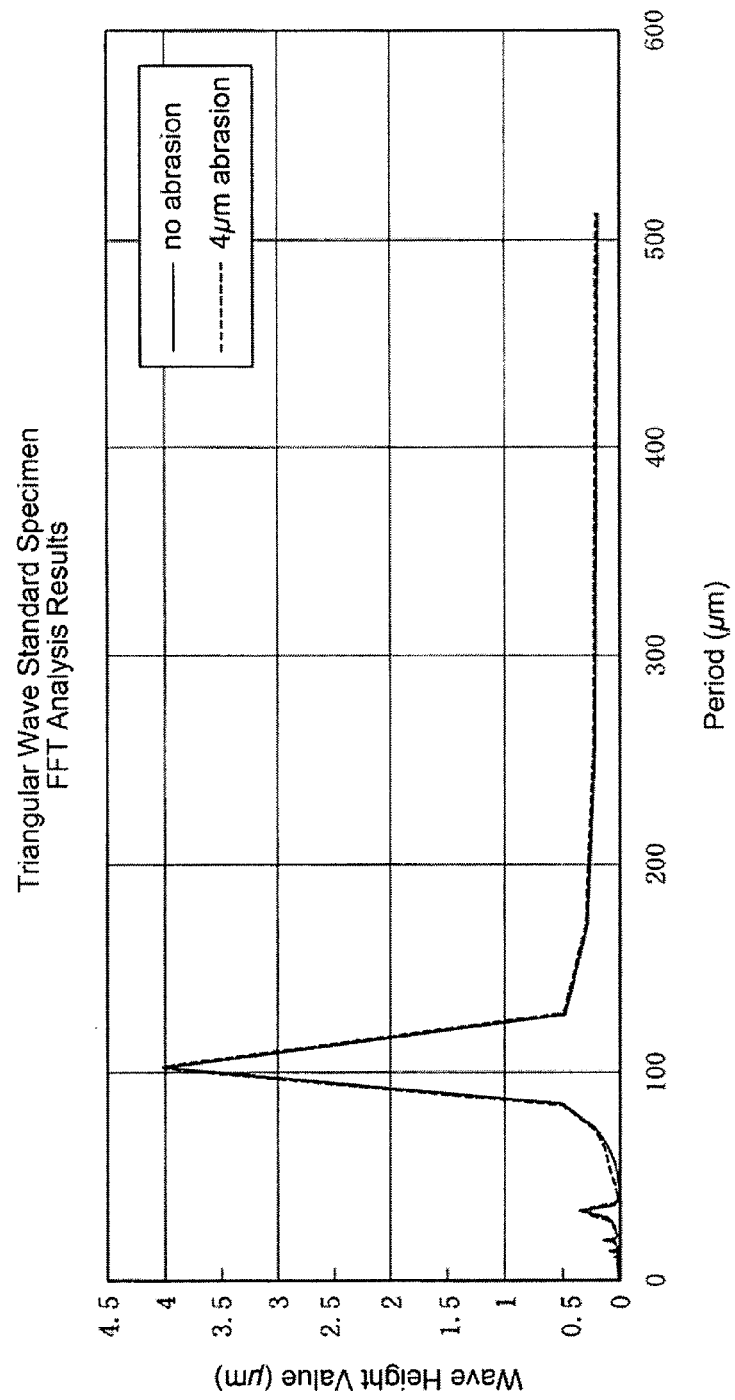
FIG. 8 illustrates FFT analysis results of the measurement curve of FIG. 7.

(Step 21) In the frequency analyzer 30, the measurement curve obtained by the controller 20 (measurement curve of triangular wave standard specimen) is taken and FFT analysis is performed on this measurement curve (frequency analysis process). For example, when FFT analysis is performed on the measurement curve shown in FIG. 7, the results shown in FIG. 8 are obtained. In FIG. 8, it is seen that the component of difference between a case where the tip of the stylus 12 is not abraded (solid line) and a case where the tip of the stylus 12 is abraded (dotted line) appears dispersed in a broad period component.

(Step 22) From the FFT analysis results, the period of a triangular wave standard specimen is obtained. That is, in FIG. 8, from the period corresponding to the peak value of the wave height value, the period of a triangular wave standard specimen is obtained.

(Step 23) The wave height value of each constant pitch (constant period) is obtained with respect to the FFT analysis results stored as the initial value (initial value frequency analysis result) and the FFT analysis results obtained in Step 21 (frequency analysis result for abrasion detection).

(Step 24) The difference is integrated between the wave height value of each constant pitch (period) of the initial value FFT analysis results, and the wave height value of each constant pitch (period) of the FFT analysis results for abrasion detection.

(Step 25) The ratio of the integrated value to the wave height value of the triangular wave period of the triangular wave standard specimen is calculated.

(Step 26) Lastly, the ratio obtained by the processing described above is displayed on the display 50 as a standard for abrasion amount (abrasion amount display process). Specifically, the ratio obtained is displayed using a number, bar graph, color, or similar.

Figure 9:
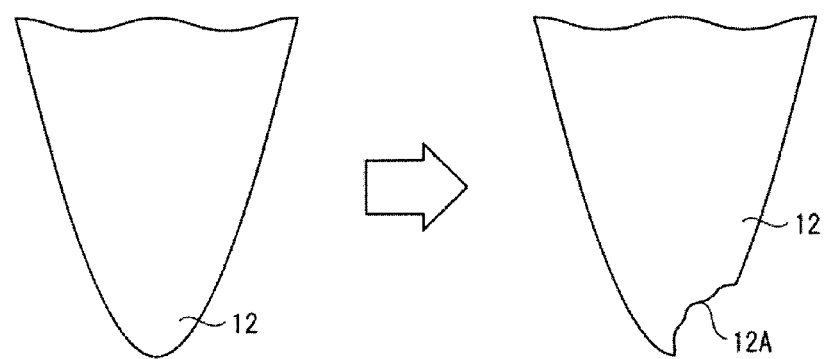
FIG. 9 illustrates a defect state of a stylus according to the embodiment.

According to the present embodiment, once a measurement curve has been found for a standard specimen (sine wave standard specimen or triangular wave standard specimen), FFT analysis is performed on the measurement curve, and from the FFT analysis result the abrasion amount of the stylus 12 is calculated. Therefore, in addition to being able to accurately detect an abrasion amount of the stylus 12, as illustrated in FIG. 9 it is also able to detect a defect 12A on the stylus 12. That is, when tracing while the portion of the defect 12A on a stylus 12 is in contact with a standard specimen, distortion develops in the measurement curve. Therefore, the defect 12A on the stylus 12 can also be detected. With stylus abrasion detection, it is possible to perform stylus abrasion detection at the same time as gain calibration of the detector 10 using a standard specimen (sine wave standard specimen, triangular wave standard specimen). Therefore, it is possible to efficiently perform stylus abrasion detection.

VARIANT EXAMPLES

The present invention is not limited to the embodiments described above. Variations, improvements, and so on which are within the scope of achieving the object of the present invention are included in the present invention. In the above-described embodiment, examples which made use of a sine wave standard specimen and a triangular wave standard specimen for a standard specimen were described. However, the present invention is not limited to these. Essentially, as long as the standard specimen is provided with a shape which repeats an unevenness periodically, other shapes are also acceptable.

In the above-described embodiment, examples applied to the surface property measurement device of the structure illustrated in FIG. 1 were described. However, the surface property measurement device is not limited to this. For example, it may also be a handheld surface property measurement device which performs a measurement while held in the hand.

The present invention can be employed in a surface property measurement device such as a thickness measurement device or a shape measurement device which performs a measurement while a stylus is in contact with an object to be measured.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A stylus abrasion detection method that detects abrasion of a stylus with a surface property measurement device, the device causing a stylus to contact a surface of a measured object, while causing the stylus to trace the surface of the measured object by maintaining contact of the stylus against the surface, detecting a displacement of the stylus in a direction perpendicular to the tracing direction, and measuring a surface property of the measured object from the detected displacement amount of the stylus, the method comprising:
   obtaining a measurement curve of a standard specimen in which a periodically-changing unevenness is formed on a surface, said obtaining the measurement curve comprising:
      causing the stylus to trace the surface of the standard specimen;
      detecting a displacement of the stylus in a direction perpendicular to the tracing direction; and
      using the displacement for obtaining the measurement curve;
   performing a Fast Fourier Transform frequency analysis on the measurement curve;
   calculating an abrasion amount of the stylus from a result of the frequency analysis by performing a filter process on the result of the frequency analysis such that only a wave height value shorter than an unevenness wave height value of the standard specimen remains; and
   displaying the abrasion amount calculated by the abrasion amount calculation.

2. The stylus abrasion detection method according to claim 1,
   the standard specimen is a sine wave standard specimen in which an unevenness is formed in the shape of a sine wave on a surface;
   said obtaining the measurement curve further comprises detecting a measurement curve of the sine wave standard specimen while causing the stylus to trace along the surface of the sine wave standard specimen,
   said calculating of the abrasion amount further comprises:
      obtaining an integrated value of a wave height value of a result obtained by the filter process; and
      obtaining a ratio of the integrated value to a wave height value of the unevenness wave height value of the sine wave standard specimen, and
   said displaying the abrasion amount comprises displaying the ratio obtained from said calculating the abrasion amount.

3. A surface property measurement device that: causes a stylus to contact a surface of the measured object while causing the stylus to trace along the surface of the measured object by maintaining the contact of the stylus against the surface; detects a displacement of the stylus in a direction perpendicular to the tracing direction; and measures a surface property of the measured object from the detected displacement amount of the stylus, the device comprising:
   a controller configured to obtain a measurement curve of a standard specimen in which an unevenness that changes periodically is formed on a surface, by: causing the stylus to trace along the surface of the standard specimen; detecting a displacement of the stylus in a direction perpendicular to the tracing direction; and using the displacement for obtaining the measurement curve of the standard specimen;
   a frequency analyzer that performs a Fast Fourier Transform frequency analysis on the measurement curve;
   an abrasion amount processor configured to calculate an abrasion amount of the stylus from the frequency analysis result obtained by the frequency analyzer by performing a filter process on the result of the frequency analysis such that only a wave height value shorter than an unevenness wave height value of the standard specimen remains; and
   an abrasion amount display configured to display the abrasion amount calculated by the abrasion amount processor.

4. A stylus abrasion detection method that detects abrasion of a stylus with a surface property measurement device, the device causing a stylus to contact a surface of a measured object, while causing the stylus to trace the surface of the measured object by maintaining contact of the stylus against the surface, detecting a displacement of the stylus in a direction perpendicular to the tracing direction, and measuring a surface property of the measured object from the detected displacement amount of the stylus, the method comprising:
   storing a frequency analysis result of an initial value;
   obtaining a measurement curve of a standard specimen in which a periodically-changing unevenness is formed on a surface, said obtaining the measurement curve comprising:
      causing the stylus to trace the surface of the standard specimen;
      detecting a displacement of the stylus in a direction perpendicular to the tracing direction; and
      using the displacement for obtaining the measurement curve;
   performing a Fast Fourier Transform frequency analysis on the measurement curve;
   calculating an abrasion amount of the stylus from a result of the frequency analysis by obtaining a wave height value for each corresponding predetermined wave height value from the result of a frequency analysis of the initial value and a result of a frequency analysis for abrasion detection; and
   displaying the abrasion amount calculated by the abrasion amount calculation.

5. The stylus abrasion detection method according to claim 4, wherein:
   said storing a frequency analysis result of an initial value is performed by:
      causing an unused stylus to trace a surface of a triangular wave standard specimen in which an unevenness is formed in a shape of a triangular wave on a surface;
      detecting a displacement of the unused stylus in a direction perpendicular to the tracing direction;
      obtaining a measurement curve of the triangular wave standard specimen from the displacement; and
      performing a frequency analysis on the measurement curve of the triangular wave standard specimen to obtain the initial value, wherein:
   said obtaining the measurement curve of the triangular wave standard specimen comprises:
      using the triangular wave standard specimen; and
      obtaining a measurement curve of the triangular wave standard specimen while causing a used stylus to trace the surface of the triangular wave standard specimen,
   said performing the frequency analysis on the measurement curve of the triangular wave standard specimen comprises obtaining the result of the frequency analysis for abrasion detection by performing a frequency analysis on the measurement curve of the triangular wave standard specimen,
said calculating the abrasion amount further comprises:
  integrating a difference between the wave height values of corresponding predetermined wave height values; and
  obtaining a ratio of the integrated value of the difference to the wave height value of an unevenness wave height values of the triangular wave standard specimen, and
the displaying of the abrasion amount comprises displaying the ratio obtained by the calculating of the abrasion amount.

\* \* \* \* \*